United States Patent Office 2,792,416
Patented May 14, 1957

2,792,416
DIPHENYLACETYL SALICYLIC ACID

Robert E. Davis, Pleasant Valley, Pa., assignor to The Vale Chemical Company, Inc., Allentown, Pa., a corporation of Pennsylvania No Drawing. Application May 12, 1954,
Serial No. 429,373

3 Claims. (Cl. 260—469)

This invention relates to diphenyl acetyl salicylic acid and to its non-toxic salts and the method of preparations. The compound has the following structure:

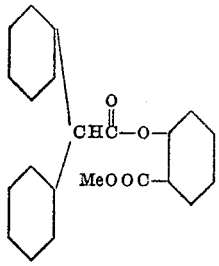

Where Me is H or some non-toxic ion or as sodium or other alkali metal.

The compounds have improved analgesic and anti-inflammatory properties and are non-toxic.

It is prepared by esterification of the hydroxyl radical of salicylic acid with diphenyl acetic acid, preferably in a form of highest activity, such as in the form of its acid halide. A preferred procedure is to react salicylic acid with diphenyl acetyl chloride by refluxing in an inert solvent.

EXAMPLE I
A. Diphenyl acetyl chloride 590 grms. of diphenyl acetic acid and one liter of thionyl chloride are refluxed for 3½ to 4 hours in a 2-liter Claisen flask having a water cooled condenser attached to the neck, the flask being tilted to allow any liquid condensed in the side arm to return to the flask. The condenser, after reaction, was then attached to the normal side arm distillation position and the flask was heated on a steam bath to distill off unreacted thionyl chloride (B. P. 80° C.). The residual reaction product was then vacuum distilled to give 550 grms. of diphenyl acetyl chloride, a yellow liquid boiling at 177–178° C. at 16 mm. Hg which solidifies on cooling.

B. Diphenyl acetyl salicylic acid 550 grms. of diphenyl acetyl chloride, prepared as described in A, is placed in a flask fitted with a refluxing condenser and 325 grms. of salicylic acid and 500 cc. benzene pre-dried over sodium wire and added thereto. The mixture is then refluxed for 5 hours while carefully excluding moisture. On cooling, crystals separate. They are filtered from the benzene and boiled for 10 minutes in water to extract unreacted diphenyl acetic acid. The crystals were then recrystallized twice from toluene. The yield is 315 grms. of diphenyl acetyl salicylic acid. M. P. 138–141° C.; neutralization equivalent 333.3–334.4 (calculated NE. 332.3).

*Analysis.*—Calculated for $C_{21}H_{16}O_4$: C—75.90; H—4.887. Found C—75.48, H—4.936.

EXAMPLE II
A. Sodium diphenylacetyl salicylate 2.2 grms. of diphenyl acetyl chloride (prepared as described in Example IA) are refluxed with 1.3 grms. of salicylic in 20 cc. of dry benzene on a steam bath for 4 hours. The benzene was then distilled off and the reaction product was boiled in water to remove unreacted diphenyl acetic acid. The product was then dissolved in a 10% aqueous solution of sodium bicarbonate. This solution evaporated to dryness gave the sodium diphenyl acetyl salicylate.

B. Diphenyl acetyl salicylic acid

The solution of the product IIA in 10% sodium bicarbonate is acidified with hydrochloric acid and pinkish white crystals of the diphenyl acetyl salicylic acid separate. The crystals are dissolved in benzene. Upon addition of petroleum ether, white crystals separate. The crystals are then re-crystallized twice from alcohol and water and these more highly purefied crystals are found to have a melting point of 142–143, and a neutralization equivalent of 333.

The product for use as a drug may be formed into tablets, enclosed in capsules or dissolved in non-toxic solvents or other desirable medicinal form.

I claim:
1. A compound selected from the group consisting of diphenyl acetyl salicylic acid having the structure

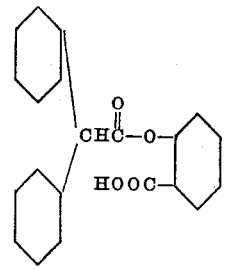

and its non-toxic salts.
2. Diphenyl acetyl salicylic acid.
3. Sodium diphenyl acetyl salicylate.

References Cited in the file of this patent
Beilstein Handbuch, X, 1st supp., (1932).